United States Patent [19]

Preston et al.

[11] 3,953,357

[45] Apr. 27, 1976

[54] VERMICULITE PRODUCTS PRODUCED BY EXFOLIATION PULVERIZATION AND CALCINATION

[75] Inventors: Ian Preston, Johannesburg, South Africa; John Charles Davidtz, Hopewell, N.J.

[73] Assignee: Mandoval Vermiculite (Proprietary) Limited, Johannesburg, South Africa

[22] Filed: Mar. 14, 1974

[21] Appl. No.: 451,125

Related U.S. Application Data

[63] Continuation-in-part of Ser. No. 271,932, July 14, 1972, abandoned.

[30] Foreign Application Priority Data

July 15, 1971 South Africa.................... 71/4705

[52] U.S. Cl. ................ 252/378 R; 210/500 R; 252/455 R; 252/457; 106/DIG. 3
[51] Int. Cl.² ............... B01J 21/16; B01D 39/06; B28D 1/32; C04B 31/26
[58] Field of Search .............. 252/378 R, 455 R; 210/75, 500; 106/DIG. 3

[56] References Cited

UNITED STATES PATENTS

| | | | |
|---|---|---|---|
| 1,922,448 | 8/1933 | Minor | 210/500 |
| 2,029,524 | 2/1936 | Denning | 252/378 R |
| 2,311,588 | 2/1943 | Denning | 106/DIG. 3 |
| 2,798,674 | 7/1957 | Denning | 252/378 R |
| 2,868,735 | 1/1959 | Myers | 252/378 R |
| 3,235,635 | 2/1966 | Riede | 210/500 |
| 3,357,929 | 12/1967 | Olstowski | 252/378 R |

FOREIGN PATENTS OR APPLICATIONS 2,004,466  11/1969  France ............... 252/378 R Primary Examiner—Patrick P. Garvin
Assistant Examiner—P. E. Konopka
Attorney, Agent, or Firm—Jordan B. Bierman; Linda Bierman; Kenneth J. Stempler

[57] ABSTRACT

A process for the preparation of vermiculite particles having enhanced properties which comprises exfoliating crude vermiculite without substantially changing its structural strength, pulverizing the exfoliated particles and subjecting them to a heat treatment so as to cause at least partial calcination.

8 Claims, No Drawings

VERMICULITE PRODUCTS PRODUCED BY EXFOLIATION PULVERIZATION AND CALCINATION

This application is a continuation-in-part of application Ser. No. 271,932 filed July 14, 1972, and now abandoned and which claims priority of South African application 71/4705 filed July 15, 1971.

The present invention relates to a process for preparing an improved vermiculite product which possesses unique uses heretofore undisclosed by prior art processes. In accordance with the present state of the art crude naturally occuring vermiculite mineral and methods for exfoliating it are well known. Such exfoliated vermiculite possesses high thermal insulation properties as well as an extremely light weight per unit volume. Normally, these exfoliated products are prepared by subjecting the crude vermiculite flakes to a temperature high enough to cause the flakes to rapidly expand to a size many times their original volume through the generation of interlaminar steam.

This is normally achieved by passing the crude vermiculite through a furnace chamber or kiln under conditions of temperature and residence time sufficient to cause exfoliation. Great care is taken in prior art processes to prevent the particles from reaching temperatures in the furnace which would cause undesirable changes in the physical and chemical properties of the exfoliated material. Such "detrimental" changes occur through the chemical process known as calcination. Typical furnace temperatures of about 1000°C are employed for exfoliation, but the particles themselves are not permitted to reach this furnace temperature because of rapid transportation through the heating chamber. When ovens or kilns are utilized at the above temperature, typical residence times of up to a few seconds are employed.

In accordance with the present state of the art there is no recognized merit to heating vermiculite particles longer than is necessary to achieve exfoliation. To the contrary, it is well known that the mechanical properties of exfoliated vermiculite degenerate if the particles are permitted to reach temperatures much above about 600°C. When this particle temperature is exceeded the exfoliated particles become highly friable. Thus, the mechanical properites are destroyed and the particles break down structurally and become unsuited for heretofore recognized uses.

In the case of vermiculite from the Phalaborwa deposits in the North Eastern Transvaal, Republic of South Africa, for example, the normal exfoliating process will produce exfoliated vermiculite particles having a light fawn shade. This physical characteristic of an end product suitable for normal known uses, such as an insulating material, is changed if the temperature is elevated, until eventually the flakes assume a dark gold or brick color. In this latter state the vermiculite is strikingly less efficient as an insulating material and would not be considered for use as such.

Typical of prior art processes, is that taught in U.S. Pat. No. 2,029,524. This patent discloses a process wherein vermiculite is rapidly heated to promote maximum expansion, or exfoliation, of the particles. The patent teaches that a further heat treatment may be employed by adding additional moisture prior to heating, thereby achieving increased exfoliation. However, it is noted that the foregoing patent concerns itself solely with exfoliation.

One of the uses for which the present invention is particularly suitable is as a filter aid. It has now been discovered that by utilizing the process hereinafter described and claimed, a vermiculite product results having a utility of a degree previously not contemplated. U.S. Pat. No. 2,798,674 describes a process in which perlite is taught as being useful for filter aid purposes. However, this process is directed solely to perlite which has been merely expanded and comminuted.

It has now been discovered that if crude vermiculite is treated in accordance with the present invention, products can be prepared which are extremely useful as filter aids, to an extent completely unrecognized heretofore.

Breifly stated the present invention comprises a method for preparing an improved vermiculite product which is especially suitable for use as a filter aid. The process comprises subjecting crude vermiculite to a temperature and residence time sufficient to cause exfoliation without substantial calcination or destruction of its mechanical properties. The exfoliated vermiculite is then pulverized to a relatively fine particle size. The pulverized vermiculite particles are then subjected to temperature and residence time conditions sufficient to cause at least partial calcination. These particles are then recovered and pulverized to a particle size suitable for the comtemplated use. The resultant product can then be used as a filter aid in competition with other filter aids manufactured from such materials as perlite and diatomaceous earth. In addition, the filter aid properties possessed by this invention are dramatically superior to those possessed by vermiculite which has been merely exfoliated.

The first step of this process, the exfoliation step, is conducted under conditions whereby the resultant exfoliated particles are substantially unchanged with respect to structural strength. This may be accomplished, for example by heating the crude vermiculite under conditions whereby its particles are exfoliated at furnace residence times which are longer in duration than those presently practised in the art, and furnace temperatures which are lower than those in established exfoliation procedures. In general, the temperature of the oven or kiln in which the particles are exfoliated is in the range of 150° to 750°C. We have found it practical to use a counter-current rotary kiln having a flame temperature of about 1100°C. The kiln temperature is controlled in the range of 550°–750°C.

Crude vermiculite having a particle size of about 500 microns is introduced into the kiln for a residence time of about one-half to 3 minutes, depending on kiln temperature. It should be understood, and is easily within the ambit of a skilled artisan, that temperatures and residence times can be greatly varied, as can the initial particle size. It is only necessary that the expansion step be conducted so as to substantially preclude calcination of the vermiculite particles. Hence, temperatures of 600°C and particles which pass a 200 micron sieve are suitable for the present process.

As the exfoliated particles are removed from the kiln, they are permitted to cool and are further pulverized and classified through use of any known particle size classification device such as screens. This intermediate crushing and classification step should be such so as to produce particles which substantially pass through a 200 micron sieve. Preferably, about 55% of the particles should pass a 20 micron sieve.

In the calcination step of this invention the pulverized exfoliated particles are heated in a furnace or kiln at a temperature of about 850°–1200°C. The residence time utilized varies from about 20–40 minutes. Preferably the particles are calcined at a temperature of about 850° for 30 minutes. When higher temperatures are utilized the residence time should be lower. For example, it has been found that suitable particles result from calcining at 1200° for about 20 minutes. In general temperatures in the range of 880°–1150°C with a residence time of about 24 minutes produce excellent products. It is necessary to carry out the heating step under such conditions that the temperature of the particles themselves is at least 600°C. so as to induce at least partial calcination.

Preferred embodiments of the present invention will now be further described by way of the following examples:

EXAMPLE 1

Crude vermiculite particles ranging in size from −2 mm to +710 microns were heated in a furnace with a temperature of about 500°C at a residence time of about 2 minutes, to provide exfoliated vermiculite particles. The particles were then pulverized and classified to an intermediate particle size in the range of −200 microns. These particles were then partially calcined in a furnace for about 24 minutes at a temperature of about 1000°C. The particles leaving the furnace were then cooled.

Since partial agglomeration takes place during the calcination step, the resultant vermiculite was fed to a roller crusher to de-lump the material. They were then air classified to provide selected particle size ranges.

EXAMPLE 2

Crude vermiculite which was crushed and sized to −2 mm to +710 microns (80% on grade) was heat treated in a first heating step to produce exfoliated vermiculite of approximately the same particle size in a kiln at temperatures of 650° in the exhaust flues and 780°C in the combustion chamber, the residence time in the kiln being approximately 2½ minutes.

The exfoliated vermiculite was air cooled and pulverized to produce a product having a particle size analysis of about 94% −45 microns and 50% −20 microns.

The pulverized exfoliated vermiculite was then fed into the kiln when the temperature of the exhaust flue was 880°C and the combustion chamber was at a temperature of 1150°C. The material was retained in the kiln for a residence time of about 24 minutes.

This heat treated product was allowed to cool. It was then de-lumped in a roller crusher and classified to give an end product having the following product size analysis:
 97% : −88 microns
 90% : −45 microns
 47% : −20 microns

EXAMPLE 3

The following results were obtained when the material of the above examples were experimented with as filter aids. The same volume of solution utilizing equal weights of different filtering aid materials under exactly the same conditions is set forth below:

| Filtering Medium | Filtration Time in Seconds |
|---|---|
| Diatomaceous earth | 75 |
| Exfoliated vermiculite prepared in accordance with the present invention | 74 |
| Conventionally exfoliated vermiculite pulverized to obtain a particle size equivalent to that of the present invention | 178 |

As can be seen from the above table, when conventionally exfoliated vermiculite which had not been prepared in accordance with the present process was utilized as a filter aid, it was found that the filtration time was more than double the time required with either the vermiculite of the present invention or diatomaceous earth. Great care was taken to assure standardization of the experimental results. Accordingly, equal weights of each material were utilized as well as equal uniformity of particle size. The vermiculite prepared in accordance with the present process demonstrated outstanding properties as a filter aid.

EXAMPLE 4

The following experiments were conducted to demonstrate the effect of the partial calcination heat treatment step of the present invention on the efficacy of vermiculite treated in accordance with the present process as a filter aid. Crude vermiculite was exfoliated, crushed and classified, partially calcined, and re-crushed and classified. The calcination was conducted in a furnace at a temperature of 1000°C over a range of furnace residence times. Samples of equal weight of the vermiculite were then utilized as a filter aid. The effect of residence time on filtration time is depicted in the Table below:

| Residence time in Minutes | Filtration Time in Seconds |
|---|---|
| 5 | 134 |
| 10 | 101 |
| 15 | 94 |
| 20 | 83 |
| 25 | 67 |
| 30 | 62 |
| 35 | 60 |
| 40 | 55 |

It can be seen from the above table that the partial calcination step which is included in the present invention yields dramatic changes in the efficacy of the vermiculite product as a filter aid.

It will become apparent to one of reasonable skill in the art that the temperatures at which the calcination step may be conducted may be reduced by employing a suitable flux admixed with the vermiculite particles.

It will also be appreciated that the foregoing discussion with respect to particle size is not limited to the particle size analysis set forth supra. This invention also includes within its scope heat treated exfoliated vermiculite which has been microclassified. The scope of this invention is further intended to include a method of filtration employing a filter aid comprising the vermiculite product prepared in accordance with the present invention. Especially practical is the use of the particles of the present invention in situations requiring filter aids which are acid resistant materials.

What is claimed is:

1. A method for preparing an improved vermiculite product, which is especially suitable as a filter aid, which comprises
   subjecting crude vermiculite to a temperature sufficient to cause exfoliation;
   pulverizing the exfoliated vermiculite to a particle size of less than about 200 microns;
   heating the pulverized exfoliated vermiculite particles to a temperature and for a time sufficient so that the temperature of the particles themselves is at least 600°C to cause at least partial calcination; and
   recovering the partially calcined vermiculite.
2. The method of claim 1 in which the vermiculite is exfoliated at a temperature of about 150° to 750°C.
3. The method of claim 1 in which the vermiculite is exfoliated at a temperature of about 150° to 750°C and the exfoliated vermiculite is pulverized to a particle size of about 50% −20 microns.
4. The method of claim 1 in which the pulverized particles are heated for about 20 to 40 minutes at a temperature of about 850° to 1200°C.
5. The method of claim 1 in which the pulverized particles are heated at a temperature of from 880° to 1150°C for about 24 minutes.
6. A filter aid which comprises vermiculite particles prepared in accordance with the method of claim 1.
7. The method of claim 1 in which the recovered at least partially calcined vermiculite is crushed and classified.
8. A filter aid which comprises the crushed and classified product prepared in accordance with the method of claim 7.

* * * * *